Jan. 3, 1928.
A. B. DRÄGER
1,654,925
AIR PURIFYING CARTRIDGE FOR BREATHING DEVICES
Filed June 26, 1922
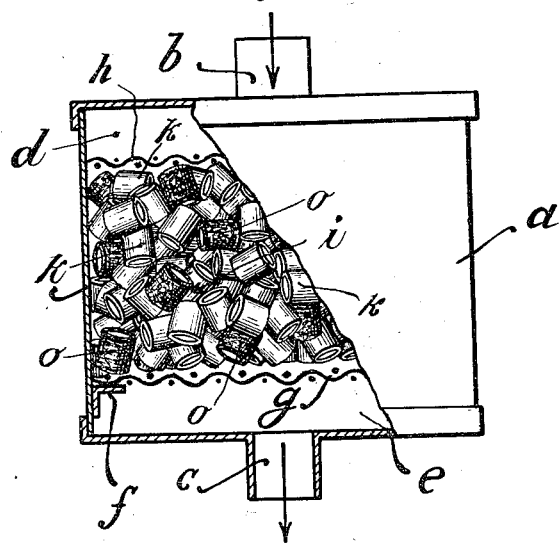
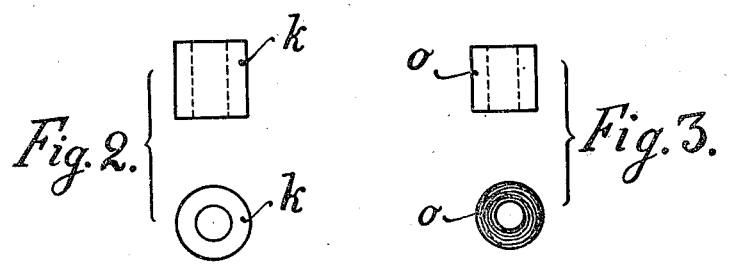
INVENTOR
ALEXANDER BERNHARD DRÄGER
BY
ATTORNEYS Patented Jan. 3, 1928.

1,654,925

UNITED STATES PATENT OFFICE.

ALEXANDER BERNHARD DRÄGER, OF LUBECK, GERMANY.

AIR-PURIFYING CARTRIDGE FOR BREATHING DEVICES.

Application filed June 26, 1922, Serial No. 571,112, and in Germany February 13, 1922.

For absorption and reaction towers hollow cylindrical filling bodies of sheet metal are already known, the height of which is approximately equal to their diameter. These filling bodies are dropped or poured into the tower in no particular order and in consequence of their irregular arrangement and the frequent change of direction of their external surface compel the current of gas or liquid passing over them to continually change its direction.

It has also already been proposed for air purifiers or more properly air purifying cartridges of breathing apparatus or breathing appliances to use such filling bodies but with perforated walls as carriers of any suitable chemical material known per se and adapted to absorb carbonic acid gas or carbon dioxid, by immersing small wire gauze cylinders in such melted or fused absorbing material for example, allowing the coating thus obtained to solidify and then dropping or bringing in the filling bodies so obtained in an irregular arrangement into the casing or receptacle of the cartridge.

Suitable means must, however, be provided for sucking up the moisture or lye which is formed during the use of the cartridge by the action of the products of exhalation on the absorbing material in the air purifying cartridge. For this purpose linings or layers of a suitable fabric or material, for example layers of blotting paper or the like, have been employed, which are usually placed at the bottom of the cartridge casing. In air purifiers which are filled with filling bodies dropped in in an irregular arrangement and serving as carriers of chemicals or forming the charge in conjunction with absorbing material in a granular form, the filling has already been mixed with cuttings of blotting or fleecy paper in order to suck up and retain the moisture or lye formed within the cartridge.

The use of such simple paper cuttings has however been found not to answer the purpose in the case of a charge composed of hollow cylindrical filling bodies, because the paper cuttings easily choke the air passages in and between the filling bodies or make them irregular.

The present invention is based on the entirely novel idea of making the carbon dioxid absorbing filling bodies for use in air purifiers directly i. e. of absorbing material only, by casting or pressing, that is to say without the use of any kind of separate carrier whatever.

An additional feature of the invention is that with the said hollow cylinders of absorbing material are mixed approximately similar filling bodies of a material adapted to suck up and retain the moisture or lye formed in the cartridge during its use.

A constructional example of the invention is diagrammatically shown in the drawing.

Figure 1 is a vertical longitudinal section through an air purifier or cartridge having any appropriate horizontal cross-sectional area and being constructed according to the present invention.

Figure 2 shows on a larger scale i. e. approximately of normal size in elevation and plan a single hollow filling body of absorbing material, and Figure 3 is a view similar to Figure 2, which shows a single hollow filling body of blotting paper likewise of approximately normal size.

In Figure 1 $a$ denotes the casing of the cartridge, $b$ the air inlet for the exhaled breathing air to be purified, $c$ is the outlet for the purified air, $d$ the upper air inlet chamber and $e$ is the lower air outlet chamber. Between the lower sieve plate $g$ (carried in the casing $a$ in a suitable manner on supports $f$) and the upper sieve plate $h$ is placed the filling or charge $i$ of the cartridge which is traversed in the direction of the arrows by the exhaled breathing air to be purified.

The filling $i$ of the cartridge consists either only of hollow cylindrical filling bodies of some suitable carbon dioxid absorbing material (such as caustic potash or soda) charged into the casing in irregular arrangement so as to be arranged promiscuously therein between the inlet and outlet of said casing, or said filling $i$ may consist of a mixture of such filling bodies of absorbing material and of preferably hollow cylindrical filling bodies of a suitable substance for sucking up and retaining moisture such as blotting or fleecy paper, cellulose, corrugated cardboard, Kieselguhr, porous clay, etc. The several filling bodies k of the absorbing material and the several filling bodies o of blotting paper or the like may conveniently be of the form and size shown in Figures 2 and 3. The filling bodies o may, on the whole, be made somewhat smaller than the filling bodies k. The filling body o, shown as example, is produced by rolling or coiling a slip of blotting paper into the form of a hollow roll, and by pasting on its free end for preventing unrolling.

The height of the filling bodies k which consist only of absorbing material is approximately the same as their external diameter. Filling bodies of about 10 to 15 m. m. in height and an external diameter of equal size have yielded extraordinarily good results in respect of air purification, air resistance and power of keeping the charge dry. An important part is also played by the thickness of the walls of the filling bodies k, which must not be below a certain amount, in order to prevent the self carrying and supporting filling bodies from being completely decomposed and consumed by the products of exhalation, as then the filling bodies will collapse and consequently choke the air passages. The new absorbing filling body must therefore also, like a briquette of fuel in the fire, possess a certain self supporting strength in the exhaled air current. This self support is ensured if the thickness of the walls of the filling bodies about 15 m. m. in height is from 2 to 4 m. m. As a matter of fact it has been found by experiments that when made of the above dimensions the various filling bodies of carbon dioxid absorbing material exhibit only on their outer, inner and end faces, according to the length of time during which the cartridge has been in operation or use, a more or less deep spongy texture or decomposition, while a core of sufficient strength remains in the interior to prevent the entire collapse and glazing of the material used as absorbing means.

The incomplete utilization of the absorbing material constituting the filling bodies k is by no means a concomitant disadvantage as according to the present invention the said filling bodies can be produced without any preparatory treatment of the absorbing material thus obviating or precluding tedious chemical and mechanical preparatory processes, and the filling bodies prepared according to this invention can be introduced or charged irregularly and promiscuously as a filtering mass into the cartridge casing between a bottom and a top sieve-plate only without any separate supporting, carrying or holding devices such as superimposed intermediary perforated shelves or the like.

When the filling or charge of the cartridge consists of filling bodies k only the dimensions of the cartridge in comparison with a cartridge which is filled with a mixture of filling bodies k and o must be somewhat larger, whereas on the contrary in the case of a filling composed of a mixture of filling bodies k and o the cartridge may on the whole be made somewhat smaller, while its power and efficiency remain the same because the filling bodies o suck up and retain the lye being formed during the use of the cartridge and thereby remove such lye from the air passages.

It has been ascertained from practical experiments that hollow cylindrical filling bodies o (see Figure 3) wound from blotting paper which are of the same or approximately the same height, thickness and weight as the hollow cylinders k (see Figure 2) of carbon dioxid absorbing material are extraordinarily suitable for sucking up the lye. These filling bodies o may however be also made as solid bodies, or be perforated or wound in a spiral form.

I claim:

1. An air purifying element for use in breathing devices comprising a hollow cylindrical body made throughout of material inherently capable of absorbing carbon dioxid, said body having a molded wall of substantial thickness.

2. An air purifying filling for breathing devices, consisting of hollow cylindrical bodies made throughout of material inherently capable of absorbing carbon dioxid, said bodies being of approximately the same height as their external diameter and having molded walls of substantial thickness.

3. An air purifying filling for breathing devices, consisting of hollow cylindrical bodies made of material inherently capable of absorbing carbon dioxid and having approximately the same height as their external diameter and a thickness of walls of about one-fifth of their height.

4. An air purifying filling for breathing devices, consisting of a mixture of hollow cylindrical bodies made of material inherently capable of absorbing carbon dioxid and of other hollow cylindrical bodies made of a material inherently capable of absorbing and retaining products generated by the action of the exhalation upon said carbon dioxid absorbing bodies.

5. An air purifying filling for breathing devices, consisting of a mixture of hollow bodies made of carbon dioxid absorbing material and of other hollow bodies made of a material adapted to absorb and retain lye generated by the action of the exhalation products upon said carbon dioxid absorbing bodies, said bodies all having axial dimensions corresponding to their external diameters.

6. An air purifying filling for breathing devices, consisting of a mixture of hollow bodies made of carbon dioxid absorbing material and of other hollow bodies made of a material adapted to absorb and retain lye generated by the action of the exhalation products upon said carbon dioxid absorbing bodies.

7. An air purifying filling for breathing devices, comprising a mixture of gas-absorbing bodies and of hollow cylindrical moisture-absorbing bodies made by spirally wrapping an absorbent fabric upon itself.

ALEXANDER BERNHARD DRÄGER.